(12) United States Patent
Jordon et al.

(10) Patent No.: US 7,674,313 B2
(45) Date of Patent: Mar. 9, 2010

(54) CONTROLLED RELEASE FERTILIZER AND SYSTEM AND METHOD

(75) Inventors: Scott Jordon, Blacklick, OH (US); Jeffrey Jordan, Columbus, OH (US)

(73) Assignee: Dysart Corporation, Canal Winshester, OH (US)

( * ) Notice: Subject to any disclaimer, the term of this patent is extended or adjusted under 35 U.S.C. 154(b) by 1087 days.

(21) Appl. No.: 11/196,768

(22) Filed: Aug. 4, 2005

(65) Prior Publication Data

US 2006/0059966 A1    Mar. 23, 2006

(51) Int. Cl.
*A01C 15/00* (2006.01)
*C05D 9/00* (2006.01)
*C05D 9/02* (2006.01)

(52) U.S. Cl. ............... 71/64.11; 71/64.01; 71/64.1; 71/64.13; 422/292

(58) Field of Classification Search ........... 71/64.01, 71/64.11, 64.13, 64.1; 422/292
See application file for complete search history.

(56) References Cited

U.S. PATENT DOCUMENTS

| | | | |
|---|---|---|---|
| 4,081,264 A | 3/1978 | Ali | |
| 4,572,235 A | 2/1986 | Katzer et al. | |
| 4,671,311 A | 6/1987 | Hepperle et al. | |
| 4,880,455 A | 11/1989 | Blank | |
| 6,048,378 A * | 4/2000 | Moore | 71/64.01 |
| 6,299,663 B1 * | 10/2001 | Phinney | 71/64.13 |
| 6,805,821 B2 * | 10/2004 | Phinney | 264/117 |
| 7,175,684 B1 * | 2/2007 | Kweeder et al. | 71/59 |

FOREIGN PATENT DOCUMENTS

EP    0 158 250 A2    10/1985

\* cited by examiner

*Primary Examiner*—Wayne Langel
(74) *Attorney, Agent, or Firm*—Baker & Hostetler LLP

(57) ABSTRACT

In a method for fertilizing plants, a water source is attached to a fertilizer distribution device including a controlled release fertilizer, the water source is activated, and a controlled release fertilizer enriched solution of water is distributed from the fertilizer distribution device upon a plant or the ground. The fertilizer distribution device includes the supply of controlled release fertilizer, an inlet configured to attach to a water source and an outlet configured to release a flow of fertilizer enriched water from the fertilizer distribution device. The supply of controlled release fertilizer includes a set of granules. The granules have a plurality of different solubility rates.

21 Claims, 11 Drawing Sheets

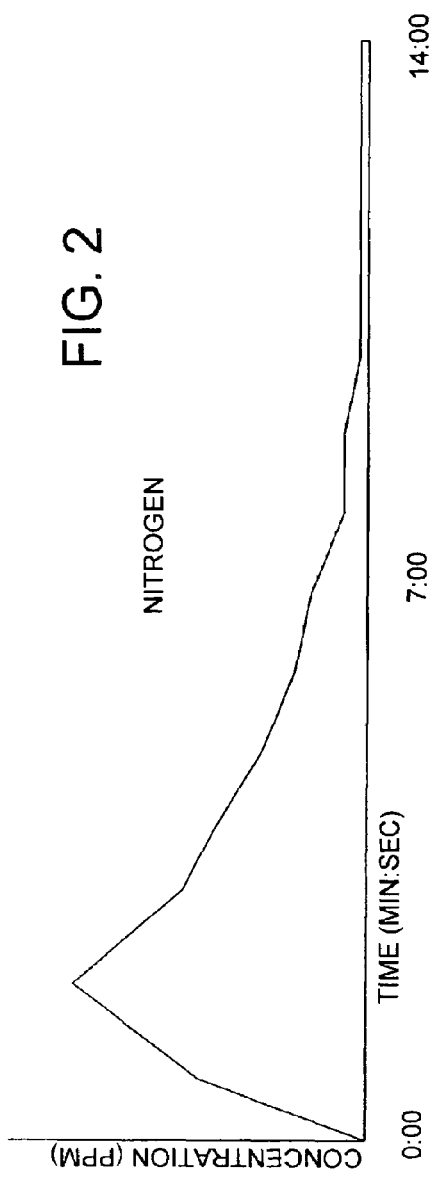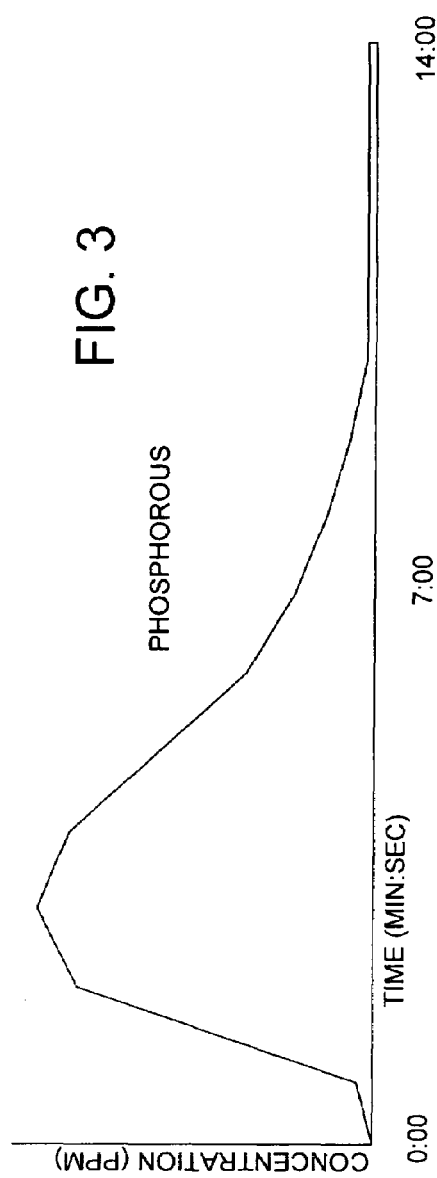

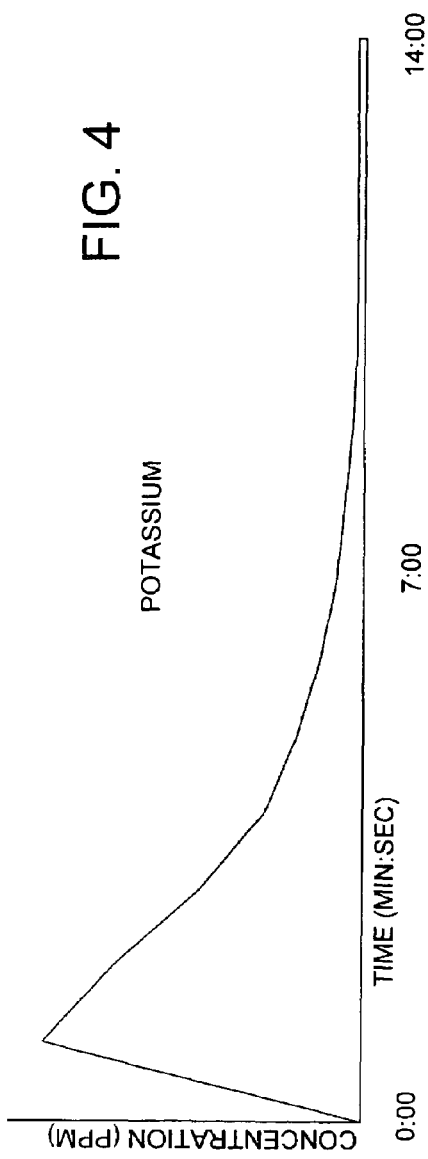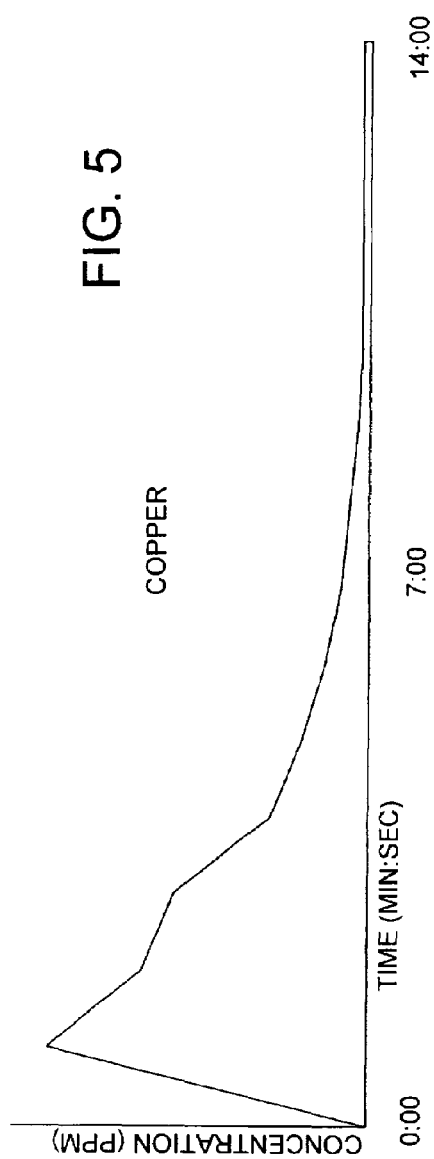

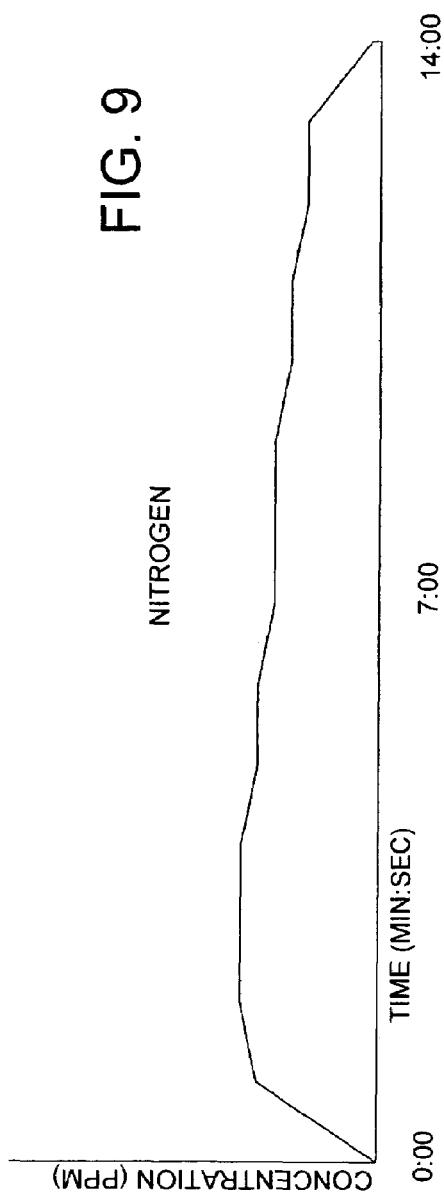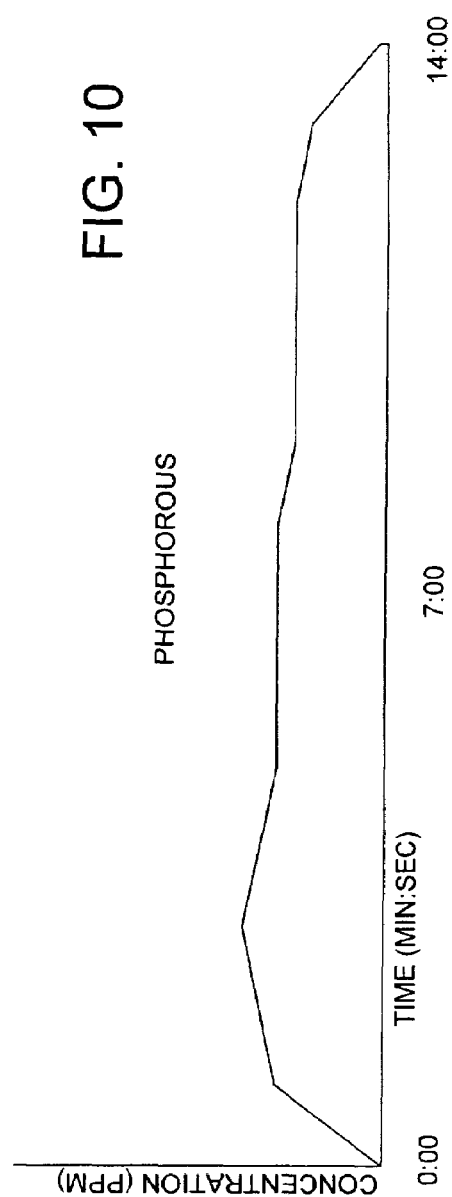

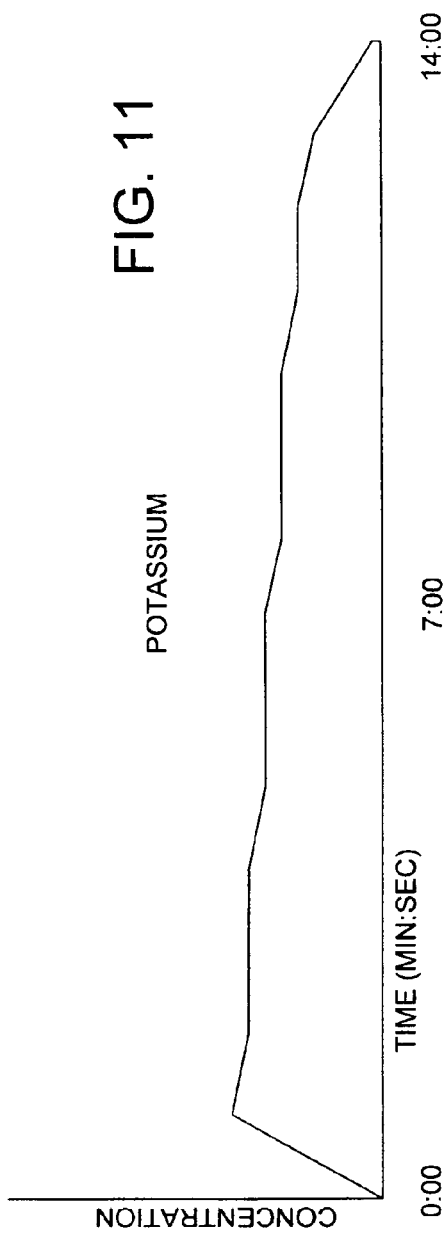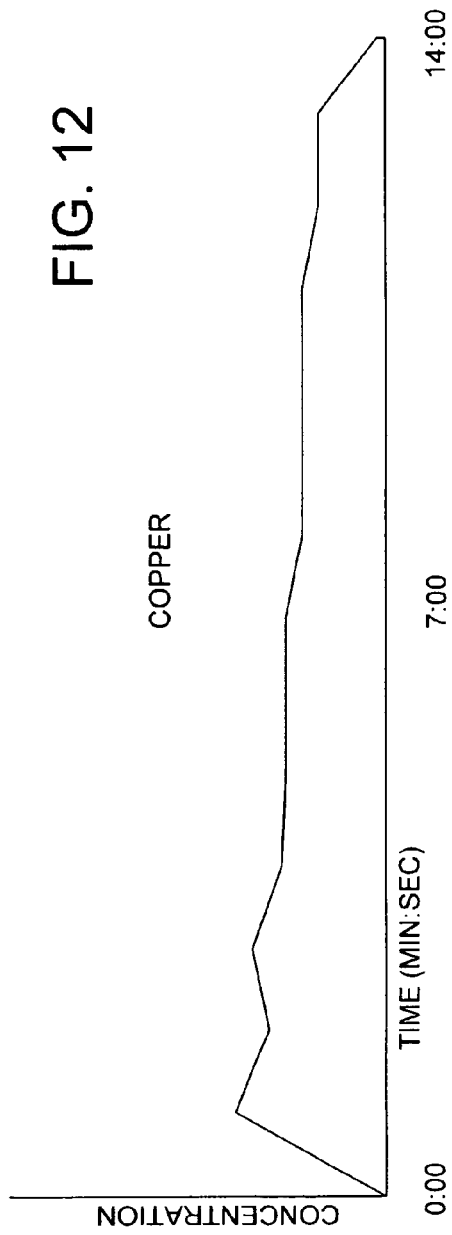

CONTROLLED RELEASE FERTILIZER AND SYSTEM AND METHOD

FIELD OF THE INVENTION

The present invention relates generally to a fertilizing composition. More particularly, the present invention relates to a method and system for distributing a controlled release fertilizing composition.

BACKGROUND OF THE INVENTION

Fertilizer distributions systems generally fall within two categories, namely, dry and waterborne systems. Waterborne systems are particularly convenient and effective in certain applications. For example, conventional waterborne fertilizer distribution systems are generally simply attached in line with conventional watering systems. In addition, users generally need not come in contact with the fertilizer and the waterborne fertilizer is readily absorbed by leaves of plants and/or into the ground where it is made available to roots of the plants.

However, in conventional waterborne fertilizer distribution systems, it is a disadvantage that the fertilizer dissolves relatively quickly. That is, the user may only have approximately 2 minutes in which to apply the fertilizer. After this time, substantially all of the fertilizer will have dissolved and passed through the conventional watering system. Thus, the user is required to stop and add more fertilizer and more time is required to distribute the fertilizer than if the fertilizer dissolved more slowly.

Accordingly, it is desirable to provide a fertilizer, fertilizer distribution system, and method of use that is capable of overcoming the disadvantages described herein at least to some extent.

SUMMARY OF THE INVENTION

The foregoing needs are met, to a great extent, by the present invention, wherein in some embodiments a fertilizer, fertilizer distribution system, and method of use are provided.

An embodiment of the present invention relates to a controlled release fertilizer including a set of granules. The set of granules includes a first portion with a first solubility rate in water. The set of granules also includes a second portion with a second solubility rate in water. The first and second solubility rates are configured to facilitate extending a duration at which an effective amount of the controlled release fertilizer is dissolved in a flow of water.

Another embodiment of the present invention pertains to a fertilizer distribution device including a supply of controlled release fertilizer, an inlet, and an outlet. The supply of controlled release fertilizer includes a set of granules. The set of granules includes a first portion with a first solubility rate in water. The set of granules also includes a second portion with a second solubility rate in water. The first and second solubility rates are configured to facilitate extending a duration at which an effective amount of the controlled release fertilizer is dissolved in a flow of water. The inlet is configured to attach to a water source. The outlet is configured to release a flow of fertilizer enriched water from the fertilizer distribution device.

Yet another embodiment of the present invention relates to a method for fertilizing plants. In this method, a water source is attached to a fertilizer distribution device, The water source is activated, and an enriched solution is distributed from the distribution device. The fertilizer distribution device includes a controlled release fertilizer. The controlled release fertilizer includes a supply of granules. A first portion of the supply of granules is configured to dissolve at a first rate and a second portion of the supply of granules is configured to dissolve at a second rate. The enriched solution includes an effective amount of the controlled release fertilizer to fertilize a plant. The first portion and the second portion are cooperatively configured to extend a duration of time that the effective amount of the controlled release solution is available for distribution.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a graph illustrating contact time, in minutes, of conventional fertilizer granules and water (ordinate) as it effects the concentration, in parts per million, of nitrogen in solution (abscissa).

FIG. 3 is a graph illustrating contact time, in minutes, of conventional fertilizer granules and water (ordinate) as it effects the concentration, in parts per million, of phosphorous in solution (abscissa).

FIG. 4 is a graph illustrating contact time, in minutes, of conventional fertilizer granules and water (ordinate) as it effects the concentration, in parts per million, of potassium in solution (abscissa).

FIG. 5 is a graph illustrating contact time, in minutes, of conventional fertilizer granules and water (ordinate) as it effects the concentration, in parts per million, of copper in solution (abscissa).

FIG. 9 is a graph in accordance with an embodiment of the invention illustrating contact time, in minutes, of fertilizer granules and water (ordinate) as it effects the concentration, in parts per million, of nitrogen in solution (abscissa).

FIG. 10 is a graph in accordance with an embodiment of the invention illustrating contact time, in minutes, of fertilizer granules and water (ordinate) as it effects the concentration, in parts per million, of phosphorous in solution (abscissa).

FIG. 11 is a graph in accordance with an embodiment of the invention illustrating contact time, in minutes, of fertilizer granules and water (ordinate) as it effects the concentration, in parts per million, of potassium in solution (abscissa).

FIG. 12 is a graph in accordance with an embodiment of the invention illustrating contact time, in minutes, of fertilizer granules and water (ordinate) as it effects the concentration, in parts per million, of copper in solution (abscissa).

DETAILED DESCRIPTION OF THE INVENTION

The present invention provides, in some embodiments, a controlled release fertilizer, fertilizer distribution system, and method of using the controlled release fertilizer in the fertilizer distribution system. Plants that particularly benefit from some embodiments include tomatoes, roses, flowering plants (i.e., bloom boosters), acid-loving plants (i.e., conifers, etc.), and the like.

The controlled release fertilizer is configured to generate a substantially constant concentration of various nutrients over a relatively extended period of time in comparison to conventional fertilizers. Conventional fertilizers are typically made up of relatively uniform granules. According to various embodiments of the invention, controlled release of the present invention is achieved by one or more of: varying the size of the granules; varying a coating applied to the granules; varying the porosity of the granules; and the like.

The fertilizer distribution system suitable for use with the present invention includes an otherwise conventional waterborne fertilizer distribution system containing the controlled release fertilizer. According to an embodiment, the waterborne fertilizer distribution system includes a canister of pre-measured, controlled release, fertilizer that includes attachments for a conventional watering system. In a particular example, the canister includes fitting for a watering hose. In the method of use, the user attaches a hose from a water source to an ingress of the canister, initiates a flow of water, and dispenses water upon desired plants.

Figure 1:
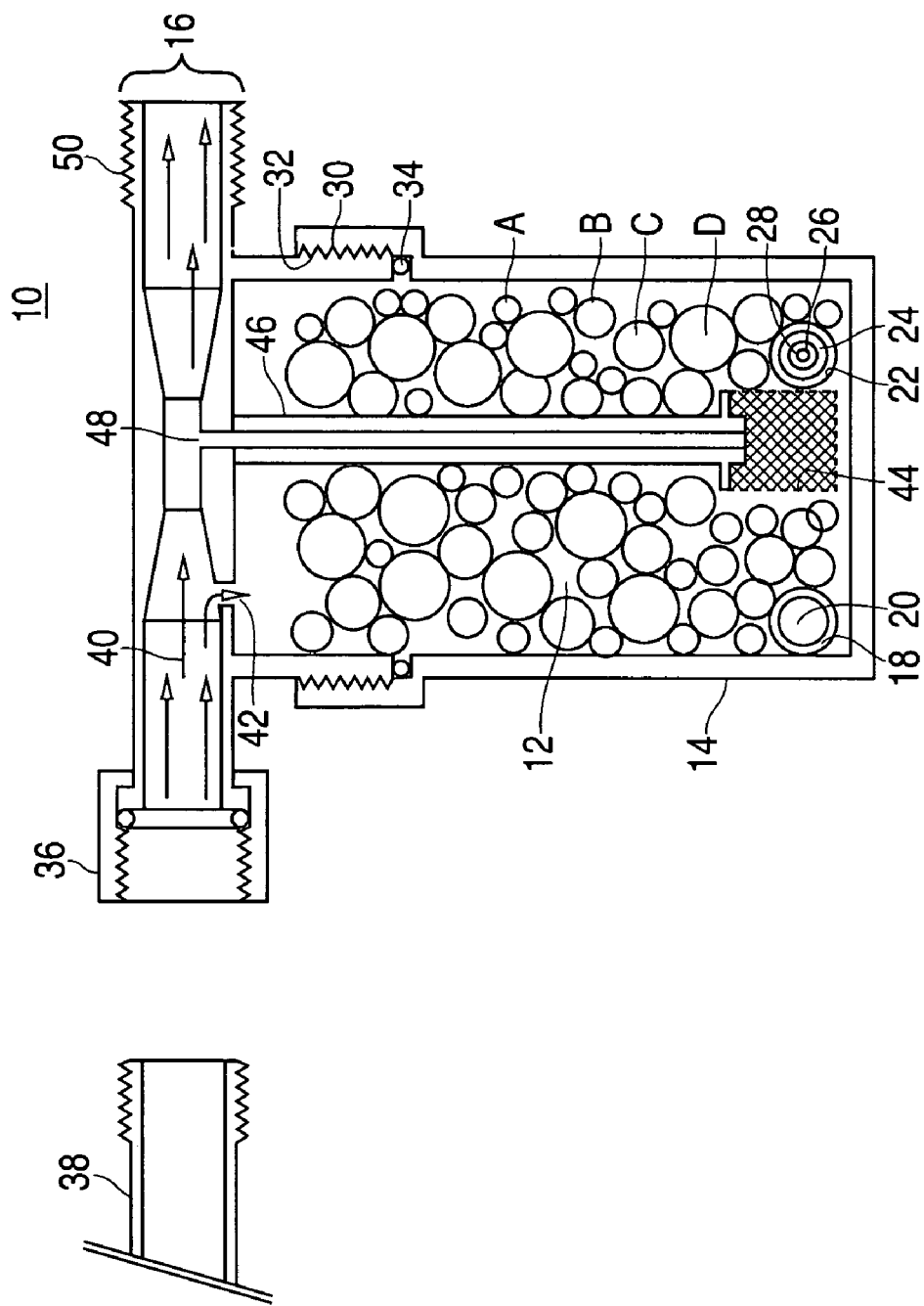
FIG. 1 is a cut away view of a fertilizer distribution device suitable for use according to an embodiment of the invention.
Figure 6:
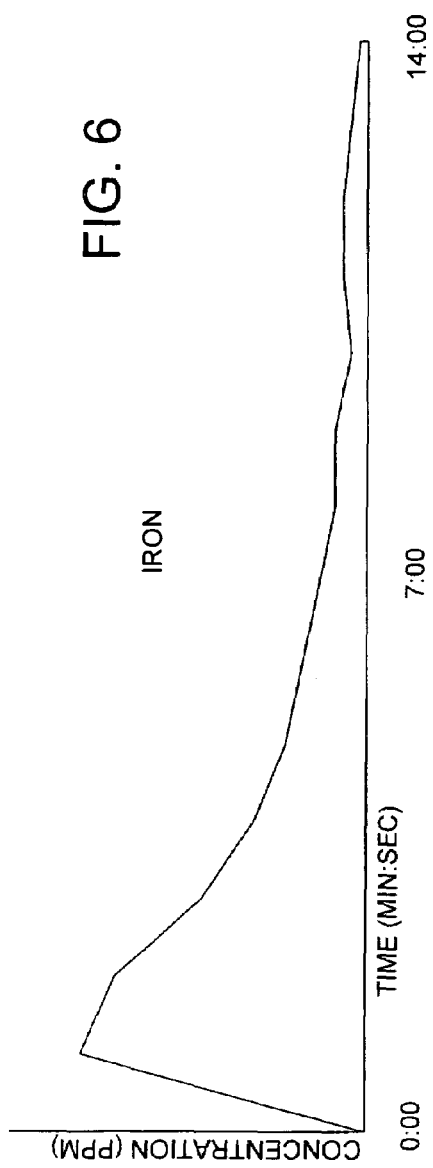
FIG. 6 is a graph illustrating contact time, in minutes, of conventional fertilizer granules and water (ordinate) as it effects the concentration, in parts per million, of iron in solution (abscissa).
Figure 7:
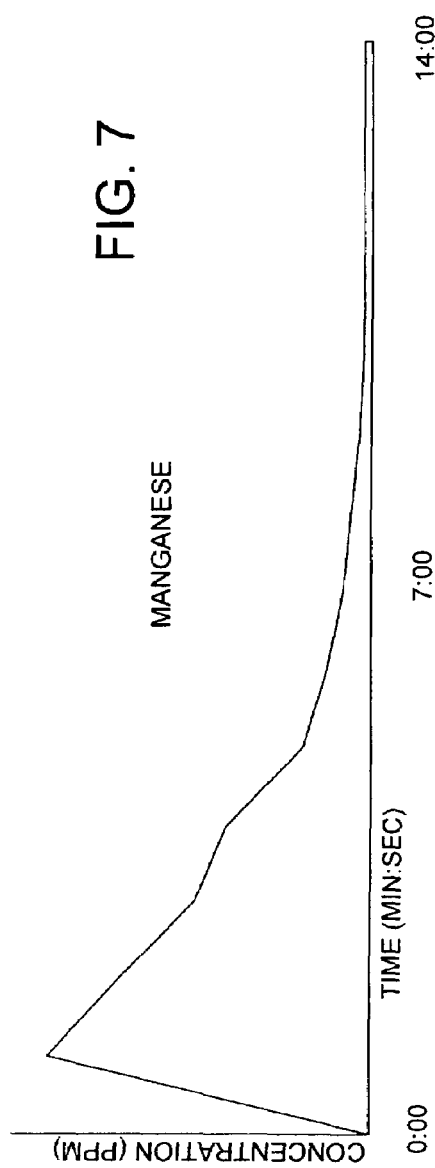
FIG. 7 is a graph illustrating contact time, in minutes, of conventional fertilizer granules and water (ordinate) as it effects the concentration, in parts per million, of manganese in solution (abscissa).
Figure 8:
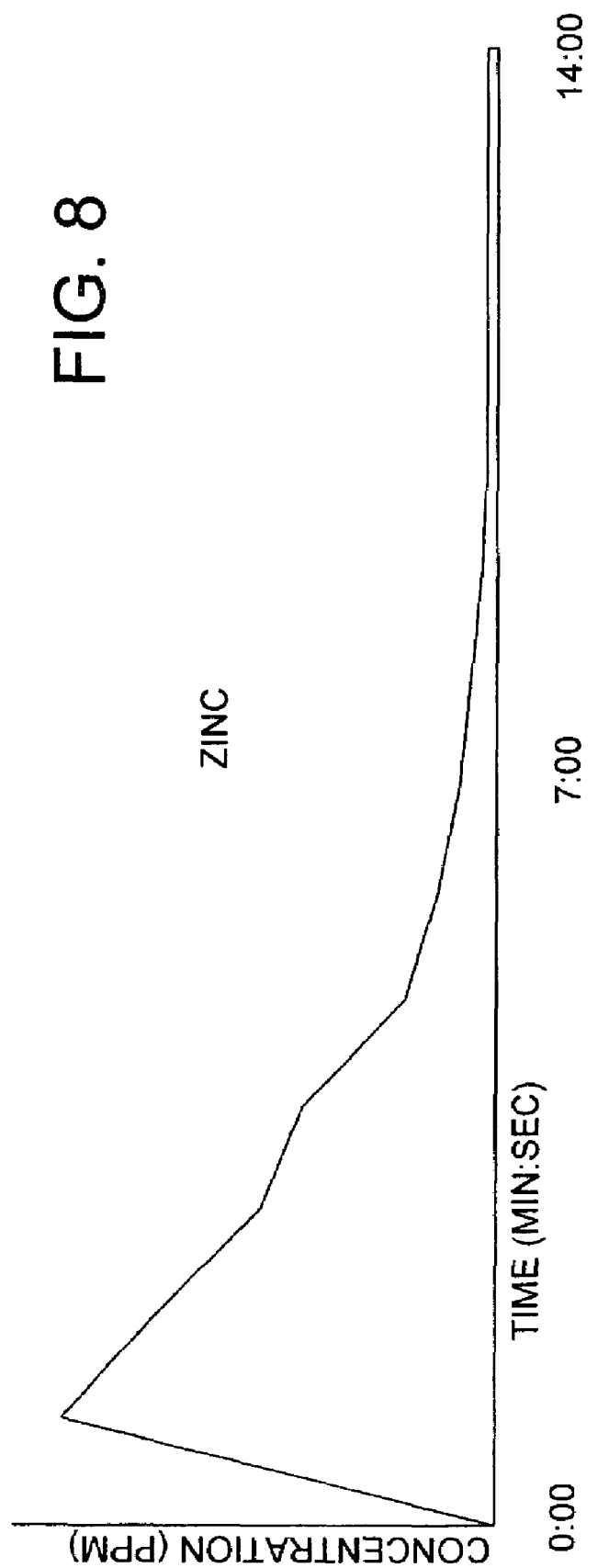
FIG. 8 is a graph illustrating contact time, in minutes, of conventional fertilizer granules and water (ordinate) as it effects the concentration, in parts per million, of zinc in solution (abscissa).
Figure 13:
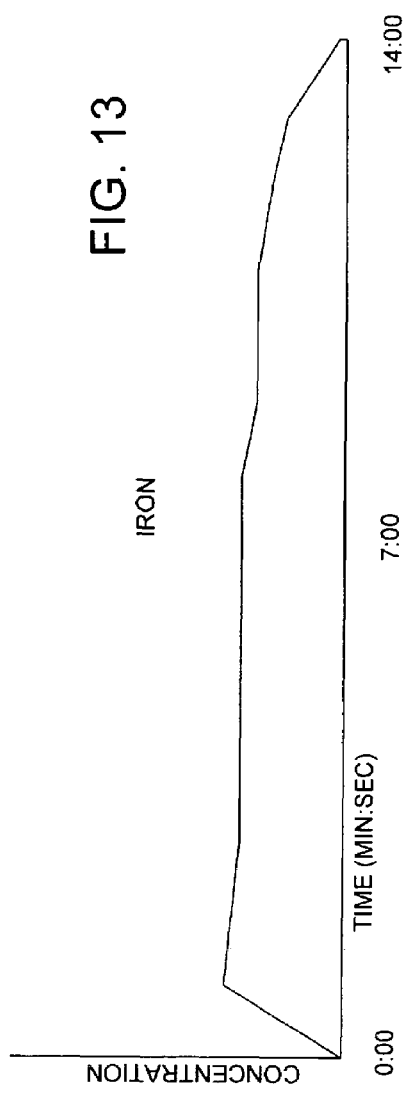
FIG. 13 is a graph in accordance with an embodiment of the invention illustrating contact time, in minutes, of fertilizer granules and water (ordinate) as it effects the concentration, in parts per million, of iron in solution (abscissa).
Figure 14:
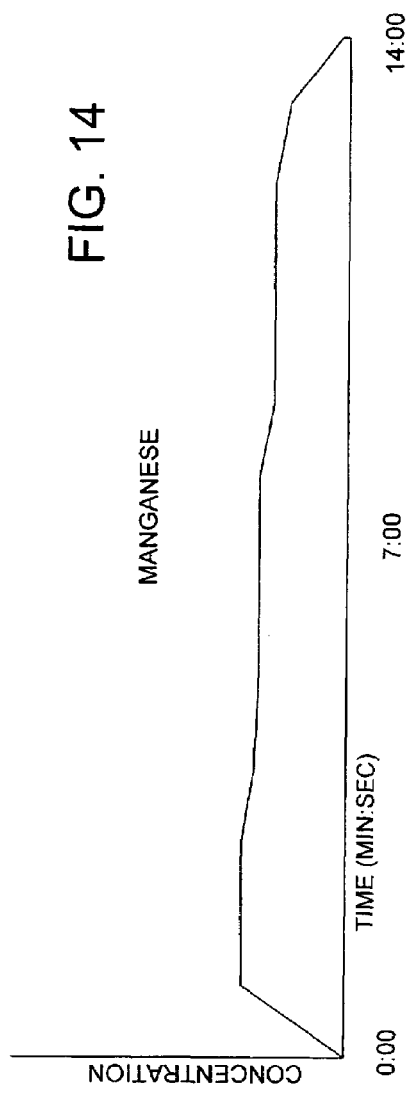
FIG. 14 is a graph in accordance with an embodiment of the invention illustrating contact time, in minutes, of fertilizer granules and water (ordinate) as it effects the concentration, in parts per million, of manganese in solution (abscissa).
Figure 15:
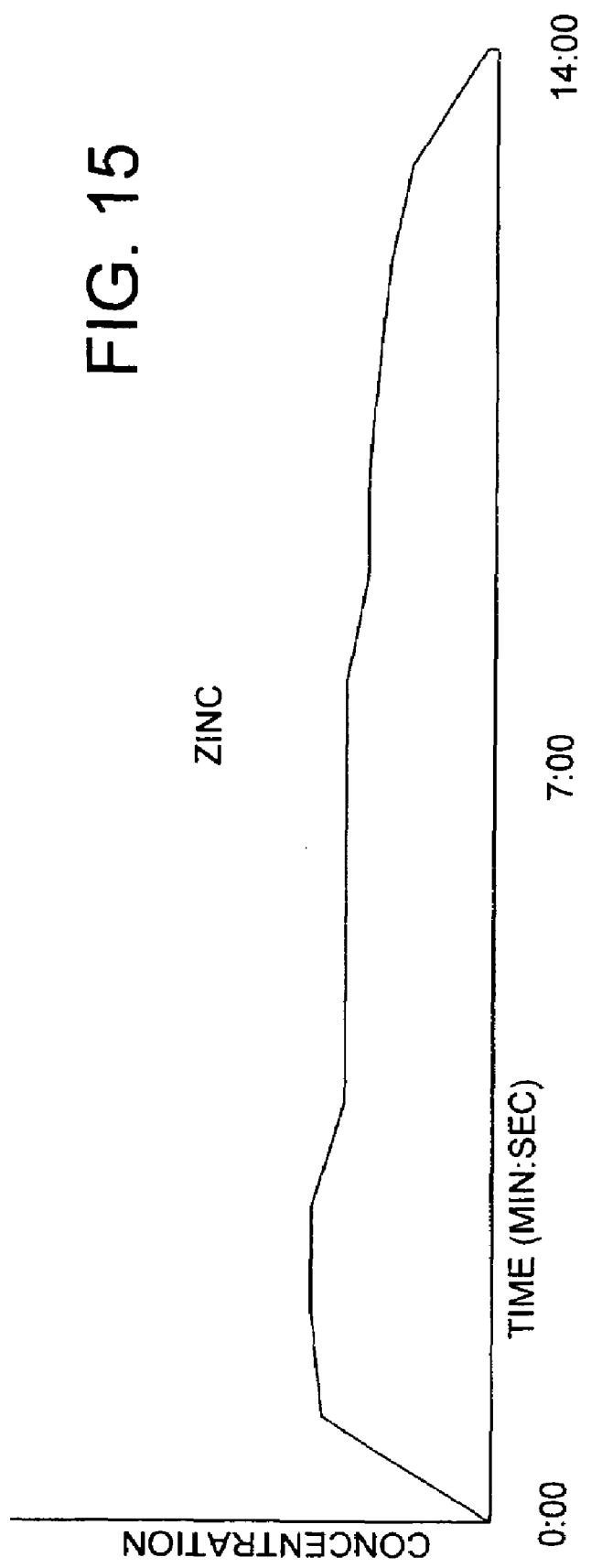
FIG. 15 is a graph in accordance with an embodiment of the invention illustrating contact time, in minutes, of fertilizer granules and water (ordinate) as it effects the concentration, in parts per million, of zinc in solution (abscissa).

FIG. 1 is a cut away view of a fertilizer distribution device 10 suitable for use according to an embodiment of the invention. As shown in FIG. 1, the fertilizer distribution device 10 includes a reserve of controlled release fertilizer 12 disposed within a canister 14. The controlled release fertilizer 12, according to an embodiment of the invention, includes a distribution of variously sized, generally spherical, granules. However, in other embodiments, the granules include other shapes, such as cubes, aggregates, and the like. In general, the distribution of sizes for the controlled release fertilizer includes powders to relatively large agglomerates. In a particular example, the controlled release fertilizer 12 includes granules A, B, C, and D that vary from small to large, respectively. As a further example, the size of the granules A-D is as follows: A 0.1 mm to 2.0 mm; B 1.0 mm to 4.0 mm; C 2.0 mm to 5.0 mm; and D 4.0 mm to 8.0 mm. Moreover, other granule sizes smaller than 0.1 mm and larger than 8.0 mm are within the scope of various embodiments. The ratio of surface area to volume of a sphere is inversely proportional to the radius of the sphere. In addition, a rate at which the granule dissolves is inversely proportional to the radius of the granule. Therefore, by including the distribution of variously sized granules, the granules A-D dissolve at different rates and tend to generate a substantially constant concentration of fertilizer over a prolonged time period.

According to another embodiment, the granules A-D include a coating 18 configured to facilitate modulating an amount of time before a body 20 of the respective granule A-D begins to dissolve. That is, the coating 18 on the granule A is configured to allow the granule A to dissolve in response to a predetermined amount of emersion time. This predetermined emersion time differs for each of the granules A-D. Thus, in a manner similar to the embodiment hereinabove, the granules A-D of this embodiment dissolve at different rates and tend to generate a substantially constant concentration of fertilizer over a prolonged time period. In addition, the granules A-D of this embodiment may be the same size or different sizes.

According to yet another embodiment, the granules A-D have different respective porosities. For example, the granule A is generated in a process that creates a great many air bubbles within the granule A, the granule B is generated with fewer air bubbles, the granule C has fewer still, and the granule D is essentially solid. Thus, in a manner similar to the embodiments hereinabove, the granules A-D of this embodiment dissolve at different rates and tend to generate a substantially constant concentration of fertilizer over a prolonged time period. In addition, the granules A-D of this embodiment may be the same size or different sizes and may include the coating 18.

According to yet another embodiment, the granules A-D include a plurality of shells 22-28 with each shell 22-28 having a different dissolving rate. For example, the shell 22 dissolves relatively slowly in comparison to the shells 24-28, the shell 24 dissolves relatively slower than the shells 26 and 28, and the shell 26 dissolves slower than the shell 28. In this manner, as the total amount of the controlled release fertilizer 12 in the container is decreased, the concentration is maintained at a substantially constant level by the increased dissolving rate. Thus, in a manner similar to the embodiments hereinabove, the granules A-D of this embodiment dissolve at different rates and tend to generate a substantially constant concentration of fertilizer over a prolonged time period. In addition, the granules A-D of this embodiment may be the same size or different sizes, may include the coating 18, and/or may have different porosity.

In some or all of the various embodiments, the controlled release fertilizer 12 includes an indicator "G" configured to indicate to the user that the controlled release fertilizer 12 is being dispensed from the canister 14. The indicator G is dispersed throughout the controlled release fertilizer 12 and configured to dissolve in water at essentially the same rate as the controlled release fertilizer 12. In conventional fertilizer systems, colorant is less soluble than the fertilizer, and thus, the user may erroneously believe conventional fertilizer is being dispensed. In an embodiment of the invention, the indicator G is exhausted at substantially the same time as the controlled release fertilizer 12. In a particular example, the concentration of the indicator G is empirically determined based upon the specific solubility rate of the controlled release fertilizer 12. The amount of the indicator C in the granules A-D or a portion thereof is varied to achieve the determined concentration. In another example, a powdered dye having a solubility rate essentially the same as the controlled release fertilizer 12 is included in the indicator C.

The canister 14 is secured to a head assembly 16 in a detachable or permanent manner. For example, as illustrated in FIG. 1, the canister 14 and the head assembly 16 include a plurality of threads 30 and 32 respectively configured to mate with one another. In addition, a gasket 34 is included at an interface between the canister 14 and the head assembly 16 to facilitate a substantially watertight seal.

The head assembly 16 further includes a fitting 36 configured to mate with a water source 38. When attached, water from a water source 38 is configured to flow through the fertilizer distribution device 10 as indicated by arrows 40. Of note, a portion of the flow of water is configured to enter the canister 14 via an inlet 42. Whereupon, the controlled release fertilizer 12 is immersed in water and the controlled release of fertilizer into the water is initiated. Water flowing through the canister 14 initially flows in a generally downward manner and is subsequently drawn through a screen 44 and upward through a vacuum tube 46. The screen 44 substantially prevents the granules A-D from clogging or entering the vacuum tube 46. To continue, fertilizer enriched water then is drawn out of the vacuum tube 46 through an outlet 48. Whereupon the fertilizer enriched water mixes with the remainder of the water flow and then flows out through an outlet 50. The outlet 50 is optionally configured to mate with a water conduit such as a spray head, water hose, sprinkler system, or the like.

FIGS. 2-8 are graphs illustrating contact time, in minutes, of conventional fertilizer granules and water (ordinate) as it effects the concentration, in parts per million, of various plant nutrients in solution (abscissa). The various plant nutrients include nitrogen, phosphorous, potassium, copper, iron, manganese, and zinc.

FIGS. 9-15 are graphs in accordance with an embodiment of the invention illustrating contact time, in minutes, of fertilizer granules and water (ordinate) as it effects the concentration, in parts per million, of various fertilizer constituents in solution (abscissa). The various plant nutrients include nitrogen, phosphorous, potassium, copper, iron, manganese, and zinc. However, the plant nutrients need not be limited to those illustrated herein, but rather, the plant nutrients listed are for purposes of illustration only. Accordingly, embodiments of the invention include any suitable plant nutrient and/or chemical additive. In a more specific example, the following table includes a list of suitable plant nutrients along with examples of a suitable respective percentage.

TABLE 1

| Nutrient | Percentage |
|---|---|
| MAP | 49.300 |
| Urea | 21.000 |
| Potassium Chloride | 24.800 |
| Urea Phosphate | 1.000 |
| Citric Acid | 1.000 |
| Liquid Dye-Blue | 0.075 |
| Premix 15-30-15 | 2.825 |

In addition to the nutrients listed in Table 1, other suitable nutrients include some or all of: DAP; Sodium Sulfate; Potassium Nitrate; MKP; MKP-TECH; Ammonium Sulfate; Magnesium Sulfate; Petro AG; Iron Chelate; and the like. As shown in Table 1, a suitable nutrient includes the Premix 15-30-15. A particular example of the premix 15-30-15 is listed in the following table.

TABLE 2

| Nutrient | Percentage of Mix |
|---|---|
| Iron Chelate | 50.98 |
| Sodium Molybdate | 0.05 |
| Sodium EDTA | 2.94 |
| Zinc Sulfate | 6.59 |
| Boric Acid | 1.49 |
| Ultra Wet | 5.05 |
| Sodium Sulfate | 1.77 |
| Manganese Chelate | 16.23 |
| Copper Sulfate | 11.9 |

In addition to the nutrients listed in Table 2, other suitable nutrients include some or all of: Manganese Sulfate; Citric Acid; red dye; Petro AG; Copper EDTA; Zinc EDTA; and the like. In contrast to FIGS. 2-8 and as shown in FIGS. 9-15, the concentration of the various fertilizer constituents in solution increases rapidly until reaching a set concentration. This set concentration is substantially maintained for a predetermined amount of time. In a particular example shown in FIG. 11, the efficiency of potassium release is increased by 61% as compared to conventional fertilizers.

Additionally, it is to be understood that the invention is not limited to the set concentration and/or predetermined amount of time illustrated in FIGS. 9-15, but rather, the invention may include any reasonable concentration and/or amount of time. Accordingly, the graph depicted in FIGS. 9-15 is for illustrative purposes only and thus is not meant to limit the present invention in any respect.

Moreover, the set concentration and/or predetermined amount of time is determined based upon system design, empirically determined data, etc. In general, the set concentration and/or predetermined amount of time may depend upon one or more of the following factors: system application, total amount of controlled release fertilizer present in the system, water flow rate through the system, size distribution makeup of the granules, solubility characteristics of the granules, water temperature, dissolved mineral content of the water, optimization of the system, environmental factors, and the like.

Figure 16:
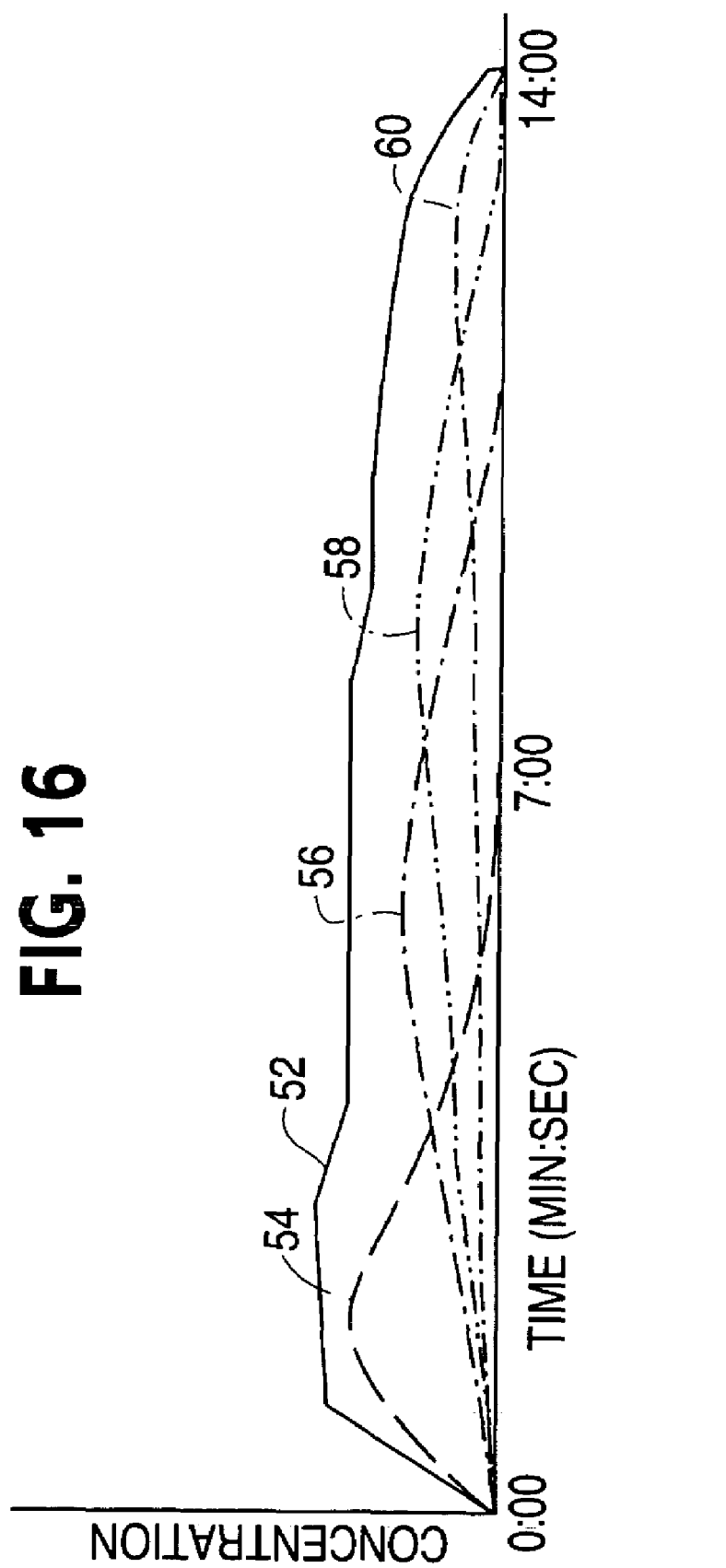
FIG. 16 is a graph in accordance with an embodiment of the invention illustrating contact time, in minutes, of fertilizer granules A-D and water (ordinate) as it effects an overall concentration and individual contributions to the overall concentration, in parts per million, of a nutrient in solution (abscissa).

FIG. 16 is a graph in accordance with an embodiment of the invention illustrating contact time, in minutes, of fertilizer granules A-D and water (ordinate) as it effects an overall concentration and individual contributions to the overall concentration, in parts per million, of a nutrient in solution (abscissa). As shown in FIG. 16, the graph includes a line 52 that represents an overall concentration over time of a nutrient in solution. In addition, a plurality of lines 54-60 represent individual respective contributions to the overall concentration by each of the granules A-D. For example, the line 54 represents the individual contribution to the overall concentration made by the granules A. The granules A, being relative smaller than the granules B-D and thus having a larger surface area to volume ratio, dissolve faster than the granules B-D. Therefore, the contribution made by the granules A increases relatively more rapidly. Accordingly, the contribution of the granules A also decreases more rapidly. In this regard, the solubility rates of the granules B-D are configured to substantially maintain the overall concentration as the contribution of the granules A decreases.

Figure 17:
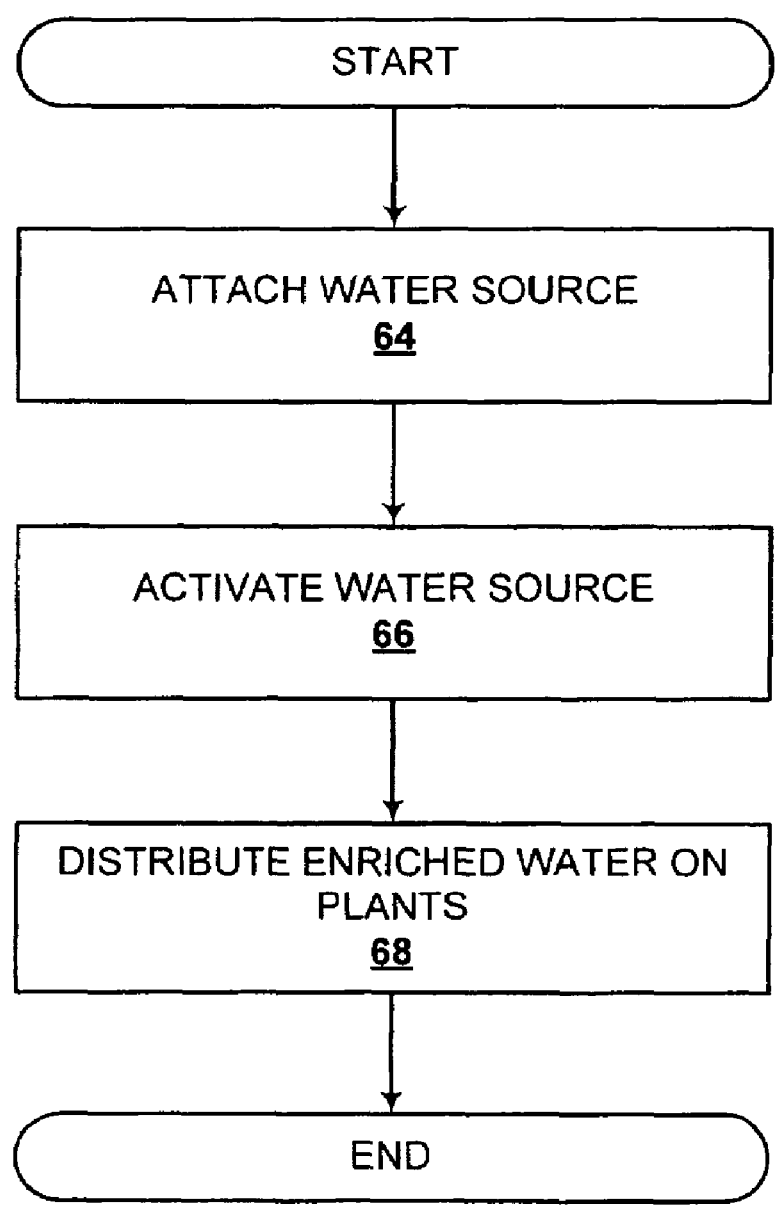
FIG. 17 is a flow diagram of a method suitable for practicing with a fertilizer distribution device according to an embodiment of the invention.

FIG. 17 is a flow diagram of a method 62 suitable for practicing with a fertilizer distribution device according to an embodiment of the invention. Prior to initiation of the method 62, a variety of steps may be performed in preparation for performing the method 62. These step may include, in no particular order, some or all of the following: obtain the fertilizer distribution device 10 preloaded with the controlled release fertilizer 12, obtain garden hose; and the like.

At step 64, the method 62 is initiated by connecting the water source 38 to the fertilizer distribution device 10. In general, any suitable conduit is utilized by the user to connect the water source 38 to the fertilizer distribution device 10. Typically, the conduit is a garden hose or tubing of a previously installed sprinkler system.

At step 66, the water source 38 is activated. For example, a valve controlling the water source 38 is turned to an open position.

At step 68, fertilizer enriched water is distributed upon plants. For example, the user directs outflow of the fertilizer enriched water from the outlet 50 to the plants. In another example, the fertilizer enriched water is directed via a sprinkler system to the plants. In various embodiments of the invention, the duration in which fertilizer enriched water flows from the outlet 50 is relatively longer than in convention fertilizer distribution devices. This increased duration facilitates a more thorough distribution. This increased duration further facilitates a reduced occurrence of plant "burning" due to excessive fertilizer concentrations.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A controlled release fertilizer comprising:
a set of substantially cube shaped granules having a multitude of portions, each portion of the multitude of portions having a size that is different from others of the multitude of portions, each portion having a respective solubility rate that is different from respective solubility rates of the other portions, a first portion of the multitude of portions having a size of 0.1 mm to 2 mm per side, a second portion of the multitude of portions having a size of 4 mm to 8 mm per side, the multitude of portions having a multitude of respective solubility rates being configured to facilitate extending a duration at which an effective amount of the controlled release fertilizer is dissolved in a flow of water.

2. The controlled release fertilizer according to claim 1, wherein the first portion includes individual granules having a first surface area to volume ratio and the second portion includes individual granules having a second surface area to volume ratio.

3. The controlled release fertilizer according to claim 1, wherein the set of granules includes a plurality of portions, each portion having a size range of one or more of 0.1 mm to 2.0 mm, 1.0 mm to 4.0 mm, 2.0 mm to 5.0 mm, and 4.0 mm to 8.0 mm.

4. The controlled release fertilizer according to claim 1, wherein the first portion includes individual granules having a first coating configured to dissolve after a first predetermined amount of time and the second portion includes individual granules having a second coating configured to dissolve after a second predetermined amount of time.

5. The controlled release fertilizer according to claim 1, wherein the first portion includes individual granules having a first porosity and the second portion includes individual granules having a second porosity.

6. The controlled release fertilizer according to claim 1, wherein the second portion is a layer enveloping the first portion.

7. The controlled release fertilizer according to claim 1, further including an indicator configured to indicate that the effective amount of the controlled release fertilizer is present in solution and wherein depletion of the indicator is configured to coincide with depletion of the controlled release fertilizer.

8. A fertilizer distribution device comprising:
a supply of controlled release fertilizer, the controlled release fertilizer comprising:
a set of substantially cube shaped granules having a multitude of portions, each portion of the multitude of portions having a size that is different from others of the multitude of portions, each portion having a respective solubility rate that is different from respective solubility rates of the other portions, a first portion of the multitude of portions having a size of 0.1 mm to 2 mm per side, a second portion of the multitude of portions having a size of 4 mm to 8 mm per side, the multitude of portions having a multitude of respective solubility rates being configured to facilitate extending a duration at which an effective amount of the controlled release fertilizer is dissolved in a flow of water;
an inlet configured to attach to a water source; and
an outlet configured to release a flow of fertilizer enriched water from the fertilizer distribution device.

9. The fertilizer distribution device according to claim 8, wherein the first portion includes individual granules having a first surface area to volume ratio and the second portion includes individual granules having a second surface area to volume ratio.

10. The fertilizer distribution device according to claim 8, wherein the set of granules includes a plurality of portions, each portion having a size range of one or more of 0.1 mm to 2.0 mm, 1.0 mm to 4.0 mm, 2.0 mm to 5.0 mm, and 4.0 mm to 8.0 mm.

11. The fertilizer distribution device according to claim 8, wherein the first portion includes individual granules having a first coating configured to dissolve after a first predetermined amount of time and the second portion includes individual granules having a second coating configured to dissolve after a second predetermined amount of time.

12. The fertilizer distribution device according to claim 8, wherein the first portion includes individual granules having a first porosity and the second portion includes individual granules having a second porosity.

13. The fertilizer distribution device according to claim 8, wherein the second portion is a layer enveloping the first portion.

14. The fertilizer distribution device according to claim 8, further including an indicator configured to indicate that the effective amount of the controlled release fertilizer is present in solution and wherein depletion of the indicator is configured to coincide with depletion of the controlled release fertilizer.

15. A method for fertilizing a plant, the method comprising:

attaching a water source to a fertilizer distribution device, the fertilizer distribution device including a controlled release fertilizer, the controlled release fertilizer including a supply of substantially cube shaped granules having a multitude of portions, each portion of the multitude of portions having a size that is different from others of the multitude of portions, each portion having a respective solubility rate that is different from respective solubility rates of the other portions, a first portion of the supply of granules having a size of 0.1 mm to 2 mm per side, a second portion of the supply of granules having a size of 4 mm to 8 mm per side;

activating the water source; and distributing an enriched solution of water from the fertilizer distribution device, the enriched solution including an effective amount of the controlled release fertilizer to fertilize the plant, wherein the multitude of portions having a multitude of respective solubility rates are cooperatively configured to extend a duration of time that the effective amount of the controlled release solution is available for distribution.

16. The method according to claim 15, wherein the first portion includes individual granules having a first surface area to volume ratio and the second portion includes individual granules having a second surface area to volume ratio.

17. The method according to claim 15, wherein the set of granules includes a plurality of portions, each portion having a size range of one or more of 0.1 mm to 2.0 mm, 1.0 mm to 4.0 mm, 2.0 mm to 5.0 mm, and 4.0 mm to 8.0 mm.

18. The method according to claim 15, wherein the first portion includes individual granules having a first coating configured to dissolve after a first predetermined amount of time and the second portion includes individual granules having a second coating configured to dissolve after a second predetermined amount of time.

19. The method according to claim 15, wherein the first portion includes individual granules having a first porosity and the second portion includes individual granules having a second porosity.

20. The method according to claim 15, wherein the second portion is a layer enveloping the first portion.

21. The method according to claim 15, further including an indicator configured to indicate that the effective amount of the controlled release fertilizer is present in solution and wherein depletion of the indicator is configured to coincide with depletion of the controlled release fertilizer.

* * * * *